United States Patent
Li et al.

(10) Patent No.: US 12,066,189 B2
(45) Date of Patent: Aug. 20, 2024

(54) METHOD OF OPTIMISING GAS TURBINE ENGINE COMBUSTION EQUIPMENT PERFORMANCE

(71) Applicant: ROLLS-ROYCE plc, London (GB)

(72) Inventors: Haidong Li, Bristol (GB); Krishnat Sadashiv Patil, Singapore (SG); Stewart J. Dawson, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/302,943

(22) Filed: Apr. 19, 2023

(65) Prior Publication Data
US 2023/0366553 A1    Nov. 16, 2023

(30) Foreign Application Priority Data

May 11, 2022  (GB) ...................................... 2206850

(51) Int. Cl.
*F23R 3/34* (2006.01)
*F02C 7/228* (2006.01)
*F23R 3/60* (2006.01)

(52) U.S. Cl.
CPC ............... *F23R 3/34* (2013.01); *F02C 7/228* (2013.01); *F23R 3/343* (2013.01); *F23R 3/346* (2013.01);
(Continued)

(58) Field of Classification Search
CPC .. F23R 3/34; F23R 3/343; F23R 3/346; F23R 3/60; F23R 2900/00016–19; F23R 3/46;
(Continued)

(56) References Cited

U.S. PATENT DOCUMENTS

| | | | |
|---|---|---|---|
| 4,910,956 A | 3/1990 | Legore et al. | |
| 5,211,004 A * | 5/1993 | Black | F23D 14/02 60/737 |
| 6,460,346 B1 * | 10/2002 | Cleary | F02C 9/28 60/779 |
| 6,883,329 B1 * | 4/2005 | Martling | F02C 7/22 60/746 |
| 6,983,603 B2 | 1/2006 | Macchia | |
| 7,451,601 B2 * | 11/2008 | Taware | F23N 5/16 60/803 |

(Continued)

FOREIGN PATENT DOCUMENTS

| | | |
|---|---|---|
| EP | 2546575 A2 | 1/2013 |
| EP | 3375982 B1 | 12/2020 |

OTHER PUBLICATIONS

Great Britain search report dated Nov. 11, 2022, issued in GB Patent Application No. 2206850.6.
(Continued)

*Primary Examiner* — Ehud Gartenberg
*Assistant Examiner* — Jingchen Liu

(57) ABSTRACT

A method of optimising the performance of combustion equipment of a gas turbine engine includes providing a fuel flow into the combustion equipment via a plurality of fuel injectors circumferentially disposed about a principal rotational axis at a plurality of injector positions; determining a plurality of temperatures of combustion gases at a plurality of circumferential positions downstream of the combustion equipment using a plurality of temperature measurement devices; ranking the plurality of circumferential positions based on the plurality of temperatures of the combustion gases determined using the plurality of temperature measurement devices; and repositioning at least some of the plurality of fuel injectors between the plurality of injector positions based at least on the ranking of the circumferential positions.

11 Claims, 9 Drawing Sheets

(52) U.S. Cl.
CPC ...... *F23R 3/60* (2013.01); *F23R 2900/00016* (2013.01); *F23R 2900/00017* (2013.01); *F23R 2900/00018* (2013.01); *F23R 2900/00019* (2013.01)

(58) Field of Classification Search
CPC .... F23R 3/48; F23R 3/50; F23R 2900/00014; F02C 7/228; F02C 9/26; F02C 9/28; F05D 2230/50–80; F05D 2260/964; G01M 15/14; G01M 15/048; F23K 5/007; F23K 2900/05001; F23N 1/007; F23N 5/02; F23N 5/022; F23N 5/025; F23N 5/027; F23N 5/24; F23N 2225/08; F23N 2241/20
See application file for complete search history.

(56) References Cited

U.S. PATENT DOCUMENTS

| | | | | |
|---|---|---|---|---|
| 7,726,019 | B2* | 6/2010 | Eroglu | F23R 3/10 |
| | | | | 60/725 |
| 9,310,072 | B2* | 4/2016 | Ainslie | F23R 3/28 |
| 9,958,152 | B2* | 5/2018 | Ramier | F23R 3/28 |
| 2007/0137212 | A1* | 6/2007 | Graves | F23R 3/286 |
| | | | | 60/776 |
| 2014/0238037 | A1 | 8/2014 | Cummings, III | |
| 2017/0211485 | A1 | 7/2017 | Tramontin | |

OTHER PUBLICATIONS

European search report dated Sep. 25, 2023, issued in EP Patent Application No. 23168299.8.

* cited by examiner

METHOD OF OPTIMISING GAS TURBINE ENGINE COMBUSTION EQUIPMENT PERFORMANCE

CROSS-REFERENCE TO RELATED APPLICATIONS

This specification is based upon and claims the benefit of priority from United Kingdom patent application number GB 2206850.6 filed on May 11, 2022, the entire contents of which is incorporated herein by reference.

BACKGROUND

Technical Field

The present disclosure relates generally to gas turbine engines, and in particular to a method of optimising gas turbine engine combustion equipment performance.

Description of the Related Art

Performance of a gas turbine engine, whether measured in terms of efficiency or specific output, may be improved by increasing a turbine gas temperature (TGT), that is, a temperature of combustion gases at a turbine of the gas turbine engine. It may therefore be desirable to operate the turbine at a highest possible temperature.

However, gas turbine engines may experience TGT cross-check issues during operation. TGT cross-check issues refer to an imbalance between average TGTs across two circumferentially extending channels. If a temperature difference between the average TGTs across the two channels exceeds a cross-check threshold of an electronic engine controller (EEC), the EEC may automatically reduce thrust produced by the gas turbine engine. This may pose a safety concern during operation of the gas turbine engine. Further, due to such TGT cross-check issues, the gas turbine engine may require an expensive engine overhaul during a maintenance.

Therefore, there may be a need to reduce or prevent TGT cross-check issues in gas turbine engines in order to improve their on-wing performance and life expectancy.

SUMMARY

In a first aspect, there is provided a method of optimising the performance of combustion equipment of a gas turbine engine having a principal rotational axis. The method includes providing a fuel flow into the combustion equipment via a plurality of fuel injectors circumferentially disposed about the principal rotational axis at a plurality of injector positions in a first circumferential arrangement. The fuel is mixed with air and the mixture is combusted to produce combustion gases. The method further includes determining a plurality of temperatures of the combustion gases at a plurality of circumferential positions downstream of the combustion equipment using a plurality of temperature measurement devices. The plurality of circumferential positions corresponds to the plurality of injector positions. The method further includes ranking the plurality of circumferential positions based on the plurality of temperatures of the combustion gases determined using the plurality of temperature measurement devices. The plurality of circumferential positions is ranked from a hottest circumferential position to a coldest circumferential position. The method further includes repositioning at least some of the plurality of fuel injectors between the plurality of injector positions based at least on the ranking of the plurality of circumferential positions. After repositioning of the at least some of the plurality of fuel injectors, the plurality of fuel injectors is disposed at the plurality of injector positions in a second circumferential arrangement different from the first circumferential arrangement.

The method of the present disclosure may optimise the performance of the combustion equipment by repositioning the at least some of the plurality of fuel injectors. The method may reduce a circumferential variation of the plurality of temperatures of the combustion gases downstream of the combustion equipment. Therefore, the method may reduce a circumferential variation of a turbine gas temperature (TGT). Consequently, the method may reduce or prevent TGT cross-check issues that typically arise due an imbalance between average TGTs across two circumferentially extending channels. The method may enable an electronic engine controller (EEC) to operate the gas turbine engine at optimal power parameters without undesirably reducing thrust output of the gas turbine engine, which may otherwise occur due to a presence of the TGT cross-check issues.

The method may improve an on-wing performance of the gas turbine engine and a life expectancy of the gas turbine engine. Furthermore, the method may prevent a requirement of an expensive engine overhaul during a maintenance of the gas turbine engine.

In some embodiments, the method further includes ranking the plurality of fuel injectors from a lowest temperature fuel injector to a highest temperature fuel injector based on predetermined flow test data. Repositioning the at least some of the plurality of fuel injectors is further based on the ranking of the plurality of fuel injectors.

In some embodiments, repositioning the at least some of the plurality of fuel injectors further includes disposing the lowest temperature fuel injector at the injector position corresponding to the hottest circumferential position. Repositioning the at least some of the plurality of fuel injectors further includes disposing the highest temperature fuel injector at the injector position corresponding to the coldest circumferential position.

In some embodiments, repositioning the at least some of the plurality of fuel injectors further includes disposing intermediate fuel injectors ranked between the lowest temperature fuel injector and the highest temperature fuel injector at respective injector positions corresponding to the circumferential positions ranked between the hottest circumferential position and the coldest circumferential position.

In some embodiments, the method further includes grouping the plurality of circumferential positions into a first channel and a second channel. Each of the first channel and the second channel circumferentially extends by 180 degrees with respect to the principal rotational axis. The method further includes determining a first average temperature of the temperatures determined by the temperature measurement devices corresponding to the first channel. The method further includes determining a second average temperature of the temperatures determined by the temperature measurement devices corresponding to the second channel. The method further includes determining a temperature difference between the first average temperature and the second average temperature. Repositioning the at least some of the plurality of fuel injectors is further based on the temperature difference.

Repositioning the at least some of the plurality of fuel injectors based on the temperature difference may reduce the temperature difference to less than or equal to a cross-check threshold of the EEC. As a result, the TGT cross-check issues may be obviated, and the EEC may operate the gas turbine engine at the optimal power parameters.

In some embodiments, after repositioning of the at least some of the plurality of fuel injectors, the temperature difference between the first average temperature and the second average temperature is less than or equal to 15 Kelvin. In some examples, the cross-check threshold may be 15 Kelvin.

In some embodiments, each injector position and the corresponding circumferential position are angularly offset with respect to each other by a predetermined angle. Such a relation between the plurality of injector positions and the plurality of circumferential positions may be referred to as a flow clocking relationship. The flow clocking relationship may be present due to a swirl in the combustion gases as they flow downstream of the combustion equipment.

In some embodiments, the predetermined angle is based on turning of a flow of the combustion gases by one or more vane assemblies disposed upstream of the plurality of measurement devices. The predetermined angle may depend upon a design of the gas turbine engine and may vary between different gas turbine engines.

In some embodiments, the plurality of temperature measurement devices is circumferentially disposed on a nozzle guide vane (NGV) assembly of a turbine of the gas turbine engine. In some examples, the NGV assembly may be of a low pressure turbine of the gas turbine engine.

In some embodiments, the method further includes communicably coupling the plurality of temperature measurement devices with a measurement harness. The measurement harness may enable recording or measuring individual readings from the plurality of temperature measurement devices.

In some embodiments, repositioning the at least some of the fuel injectors further includes detaching the at least some of the fuel injectors from the combustion equipment and attaching the at least some of the fuel injectors to the combustion equipment at corresponding injector positions of the second circumferential arrangement. The repositioning of the at least some of the fuel injectors may be performed manually by a maintenance engineer. For example, the maintenance engineer may manually detach the at least some of the fuel injectors and attach the at least some of the fuel injectors at the corresponding injector positions of the second circumferential arrangement.

In some embodiments, the fuel flow is provided to the combustion equipment during a maintenance of the gas turbine engine. Therefore, the method may be conveniently performed by the maintenance engineer during the maintenance of the gas turbine engine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e., the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e., the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e., the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e., the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e., the values may form upper or lower bounds), for example in the range of from 80 $Nkg^{-1}$ s to 100 $Nkg^{-1}$s, or 85 $Nkg^{-1}$s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e., the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e., the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e., the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24, or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e., maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION

Embodiments will now be described by way of example only, with reference to the Figures, in which.

Figure 6:
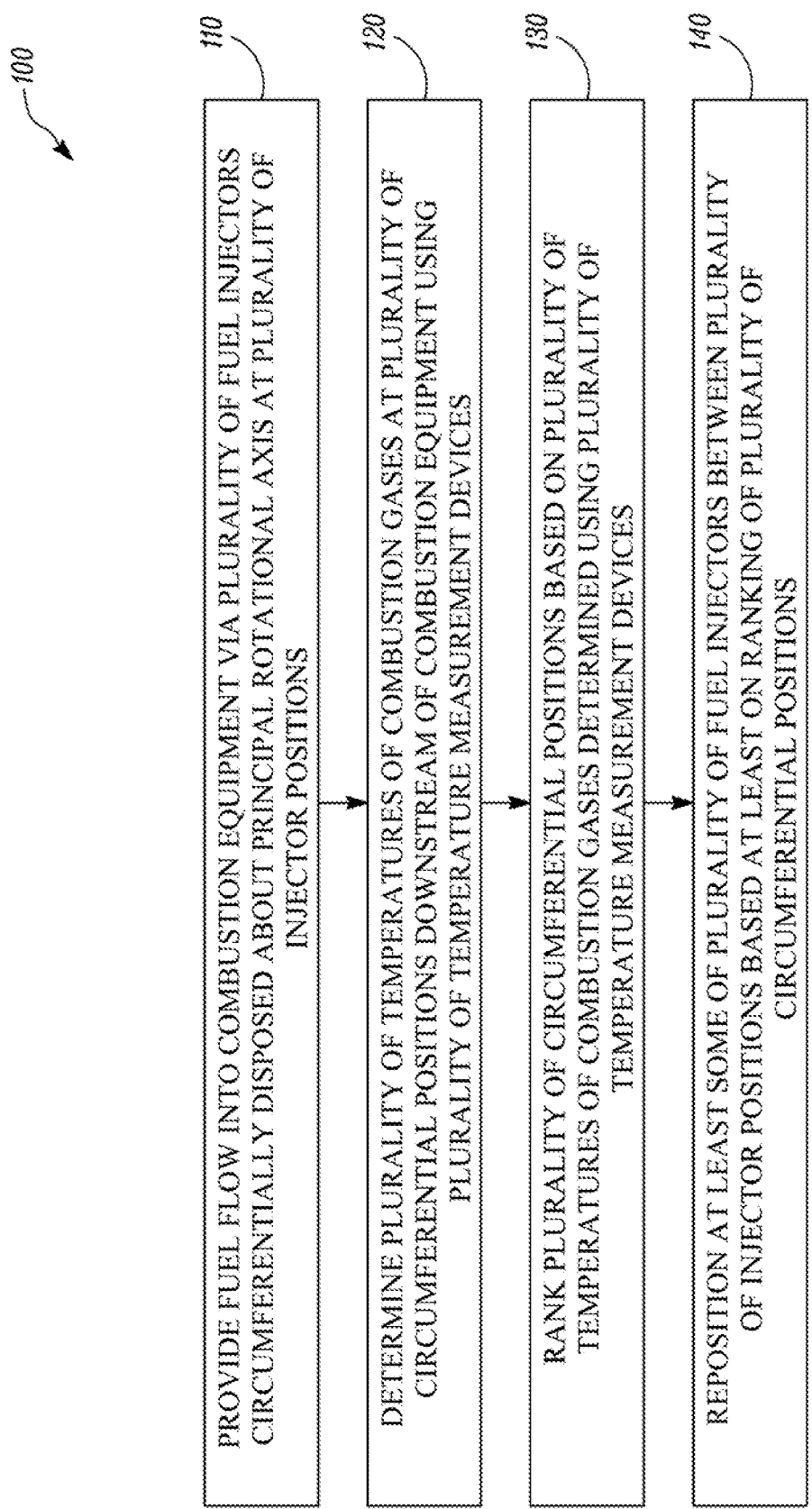
FIG. 6 is a flowchart depicting various steps of a method of optimising gas turbine engine combustion equipment performance in accordance with an embodiment of the present disclosure.
Figure 8:
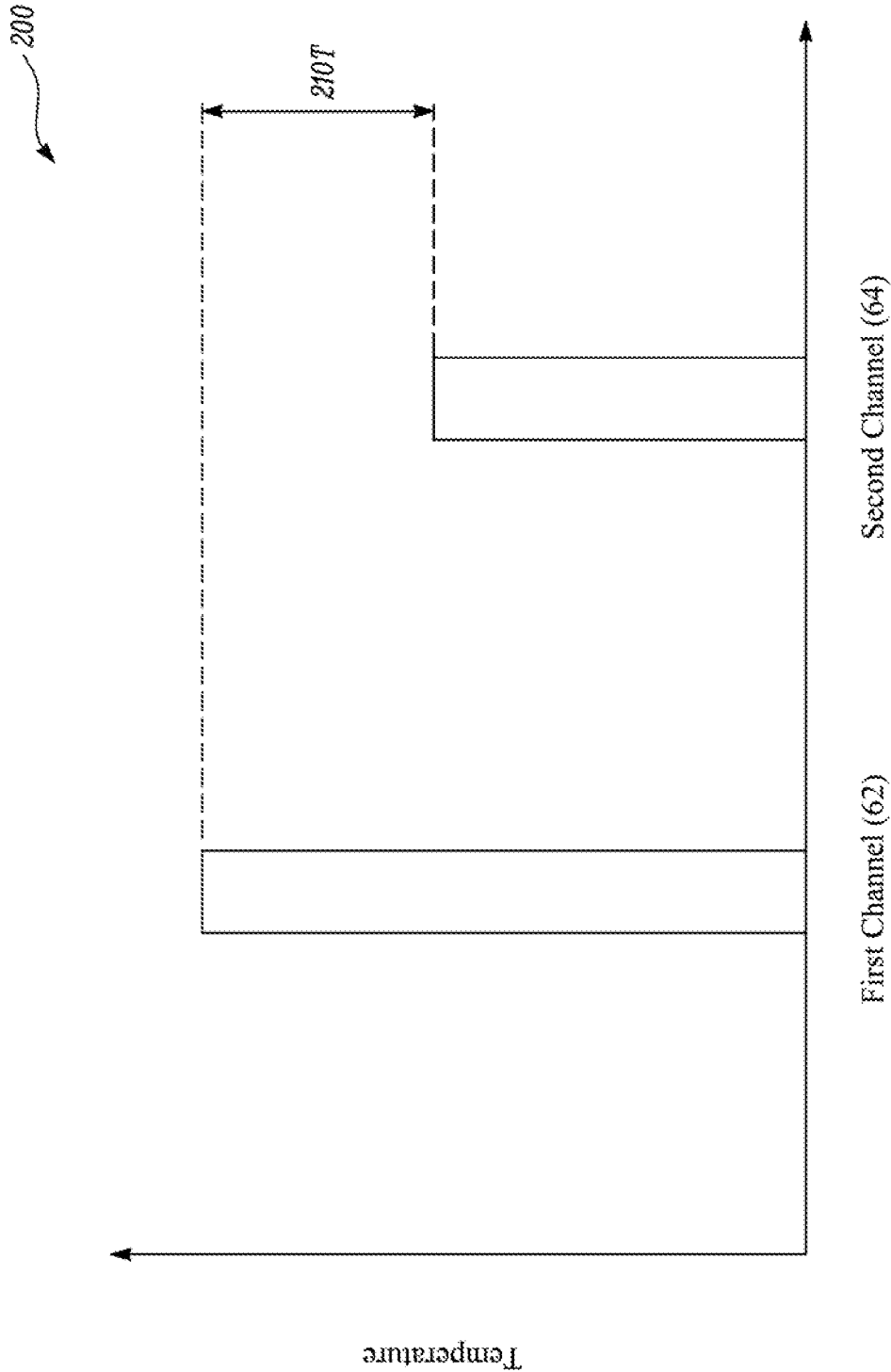
Figure 9:
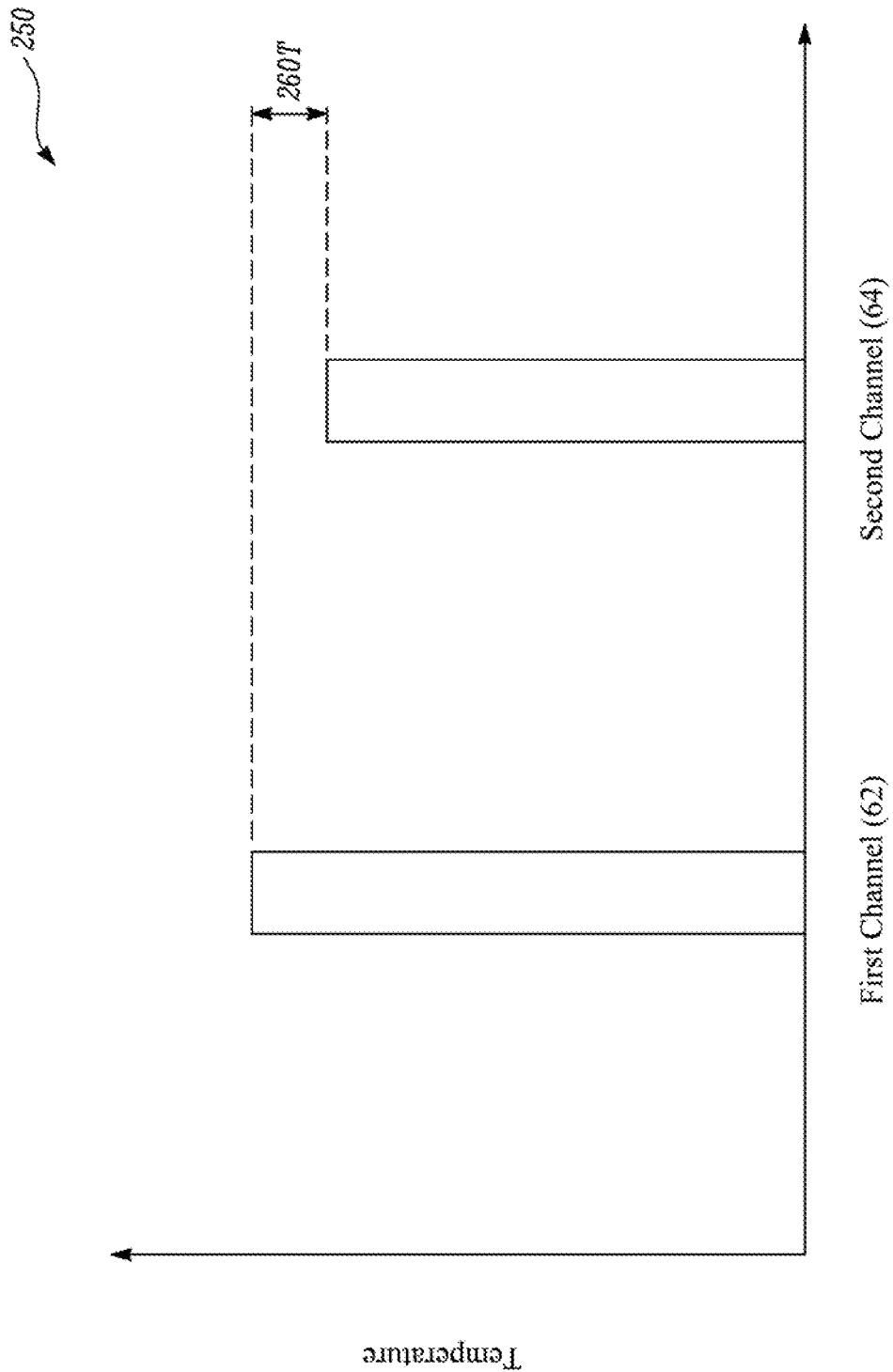

FIG. 8 is an exemplary graph depicting a temperature difference between average temperatures of a first channel and a second channel before repositioning of the at least some of the plurality of fuel injectors; and FIG. 9 is a graph depicting a temperature difference between the average temperatures of the first channel and the second channel after repositioning of the at least some of the plurality of fuel injectors based on the method of FIG. 6 in accordance with an embodiment of the present disclosure.

DETAILED DESCRIPTION

Aspects and embodiments of the present disclosure will now be discussed with reference to the accompanying figures. Further aspects and embodiments will be apparent to those skilled in the art.

Figure 1:
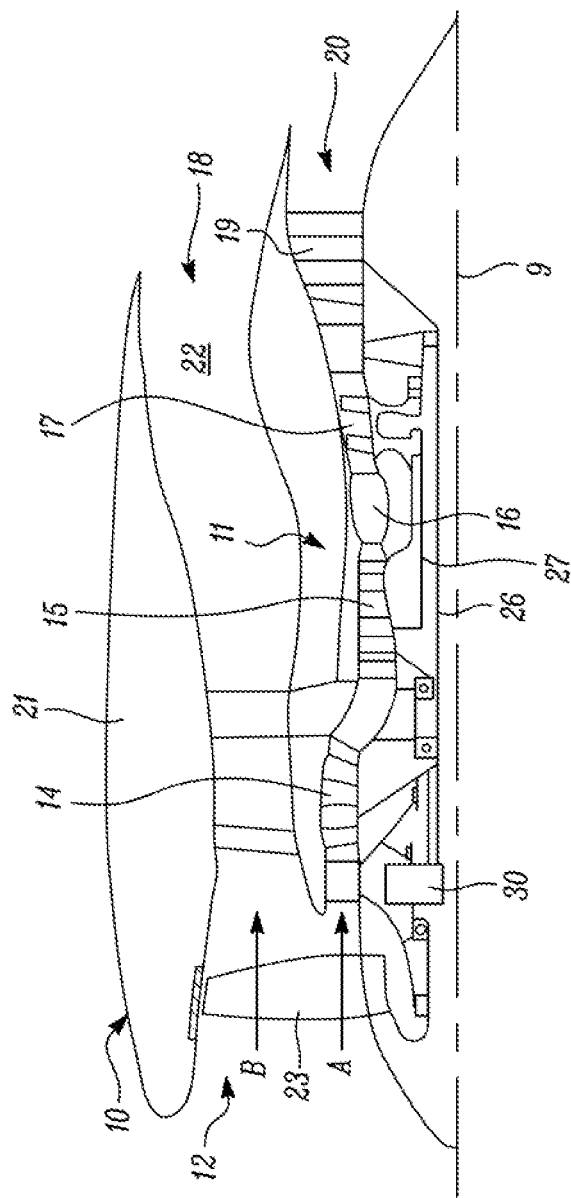
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30. In addition, the present disclosure is equally applicable to aero gas turbine engines, marine gas turbine engines, and land-based gas turbine engines.

The geometry of the gas turbine engine 10, and components thereof, is defined by a conventional axis system, comprising an axial direction (which is aligned with the principal rotational axis 9), a radial direction (in the bottom-to-top direction in FIG. 1), and a circumferential direction (perpendicular to the page in the FIG. 1 view). The axial, radial, and circumferential directions are mutually perpendicular.

Figure 2:
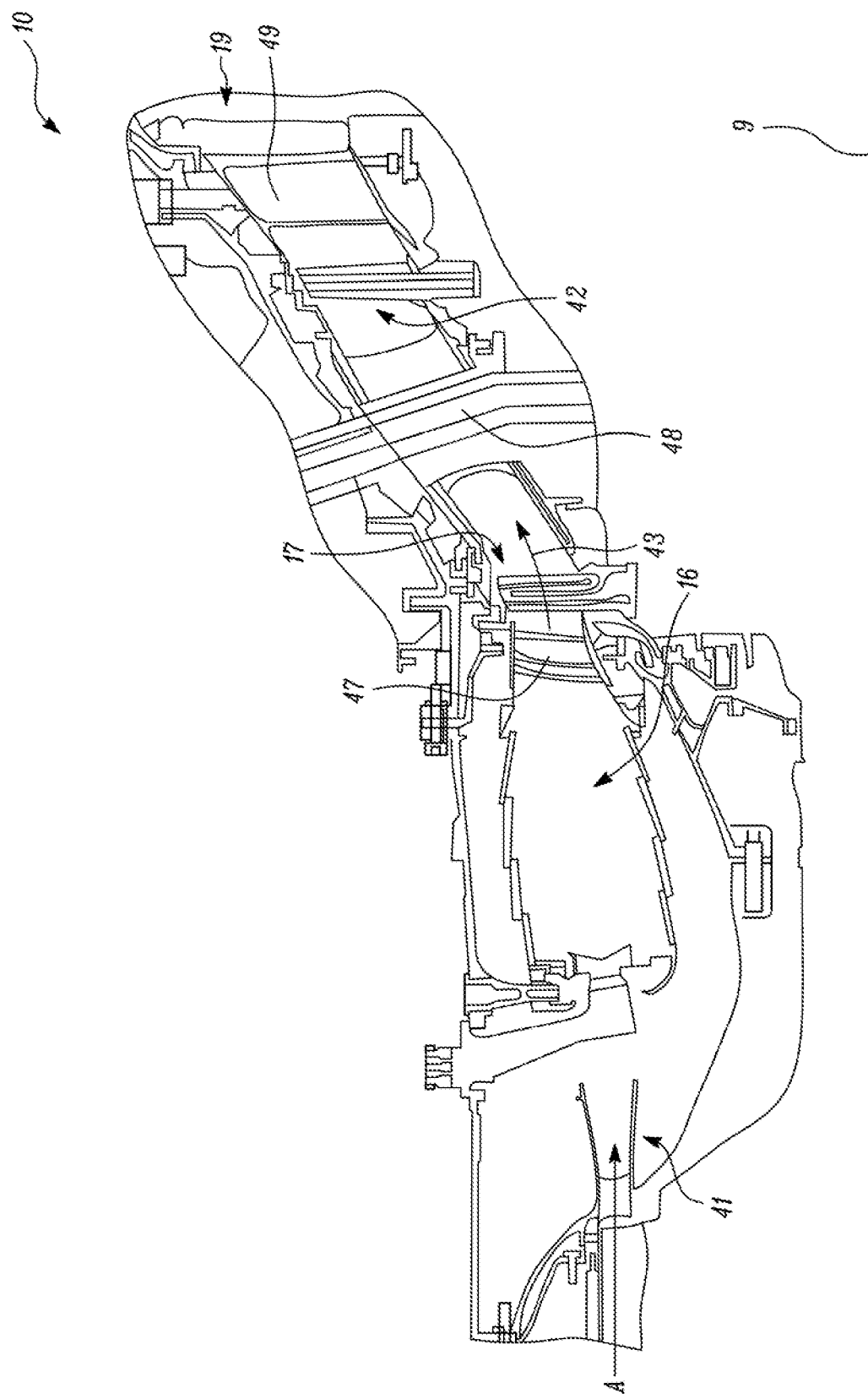
FIG. 2 is a sectional side view of a portion of the gas turbine engine.

FIG. 2 illustrates a portion of the gas turbine engine 10 of FIG. 1. As shown in FIG. 2, the gas turbine engine 10 may include a pre-diffuser 41 disposed upstream of the combustion equipment 16. The core airflow A (also shown in FIG. 1) may pass into the pre-diffuser 41 before entering the combustion equipment 16. The pre-diffuser 41 may slow down the core airflow A in order to promote efficient combustion and avoid large total pressure losses.

Figure 3:
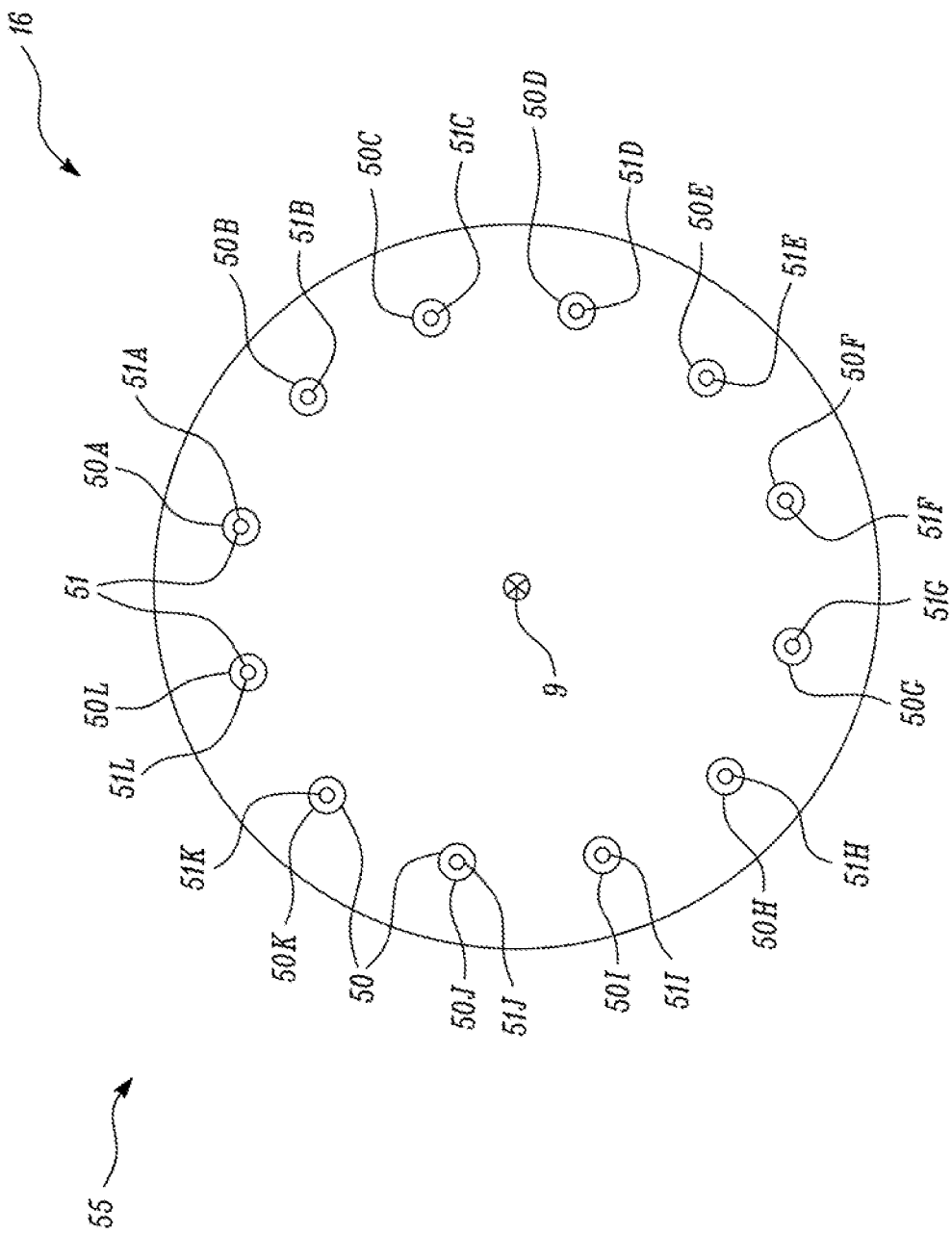
FIG. 3 is a schematic front sectional view of a combustion equipment of the gas turbine engine in accordance with an embodiment of the present disclosure.

A fuel flow is provided into the combustion equipment 16 via a plurality of fuel injectors 50 (shown in FIG. 3). The fuel is mixed with air (e.g., the core airflow A) and the mixture is combusted to produce combustion gases 43.

The gas turbine engine 10 may further include an intermediate pressure turbine 42 disposed between the high pressure turbine 17 and the low pressure turbine 19 along the principal rotational axis 9. The gas turbine engine 10 may further include a high pressure turbine (HPT) nozzle guide vane assembly 47 disposed upstream of the high pressure turbine 17 and downstream of the combustion equipment 16, an intermediate pressure turbine (IPT) nozzle guide vane assembly 48 disposed upstream of the intermediate pressure turbine 42 and downstream of the high pressure turbine 17, and a low pressure turbine (LPT) nozzle guide vane assembly 49 disposed upstream of the low pressure turbine 19 and downstream of the intermediate pressure turbine 42.

The combustion gases 43 may flow through, and drive, the high pressure turbine 17, the intermediate pressure turbine 42, and the low pressure turbine 19. A temperature of the combustion gases 43 measured at any one of the turbine stages may be referred to as a turbine gas temperature (TGT). In some cases, the TGT may be refer to the temperature of the combustion gases 43 at the low pressure turbine 19. In such cases, the TGT may be measured using temperature measurement devices circumferentially disposed on the LPT nozzle guide vane assembly 49. It may be noted that the TGT may vary circumferentially. The circumferential variation of the TGT may depend on specific engine design, manufacturing tolerances, and the like.

FIG. 3 illustrates a schematic front sectional view of the combustion equipment 16 in accordance with an embodiment of the present disclosure.

The combustion equipment 16 includes the plurality of fuel injectors 50 circumferentially disposed about the principal rotational axis 9 at a plurality of injector positions 51 in a first circumferential arrangement 55. The plurality of fuel injectors 50 and the plurality of injector positions 51 are depicted by respective circles in FIG. 3. Specifically, each of the plurality of fuel injectors 50 is schematically depicted by a bigger circle. Further, each of the plurality of injector positions 51 is schematically depicted by a smaller circle. In FIG. 3, the fuel injectors 50A-50L are circumferentially disposed about the principal rotational axis 9 at respective injector positions 51A-51L. This arrangement of the fuel injectors 50A-50L may be referred to as the first circumferential arrangement 55.

Each fuel injector 50 from the plurality of fuel injectors 50 may be fluidly coupled to a fuel line and may receive a fuel from a fuel tank (not shown) via the fuel line. The plurality of fuel injectors 50 may collectively discharge the fuel into the combustion equipment 16. In the combustion equipment 16, the fuel is mixed with air, and the mixture is combusted to produce the combustion gases 43 (shown in FIG. 2).

As discussed above, the TGT may vary circumferentially. In other words, the temperature of the combustion gases 43 (shown in FIG. 2) may vary circumferentially. Each fuel injector 50 may affect the TGT at a circumferential position of the turbine stage that corresponds to the respective injector position 51. The effect on the TGT may be dependent on an air/fuel ratio of the respective fuel injector 50. Due to manufacturing variability, design tolerances, and the like, the effect on the TGT may vary between different fuel injectors 50.

Each of the plurality of fuel injectors 50 may undergo a flow test (e.g., by its manufacturer) to determine the effect on the TGT due to the respective fuel injector 50. Therefore, the plurality of fuel injectors 50 may be ranked from a lowest temperature fuel injector 50 to a highest temperature fuel injector 50 based on predetermined flow test data. The lowest temperature fuel injector 50 may refer to one of the plurality of fuel injectors 50 that causes a lowest TGT rise. The highest temperature fuel injector 50 may refer to one of the plurality of fuel injectors 50 that causes a highest TGT rise.

Figure 4:
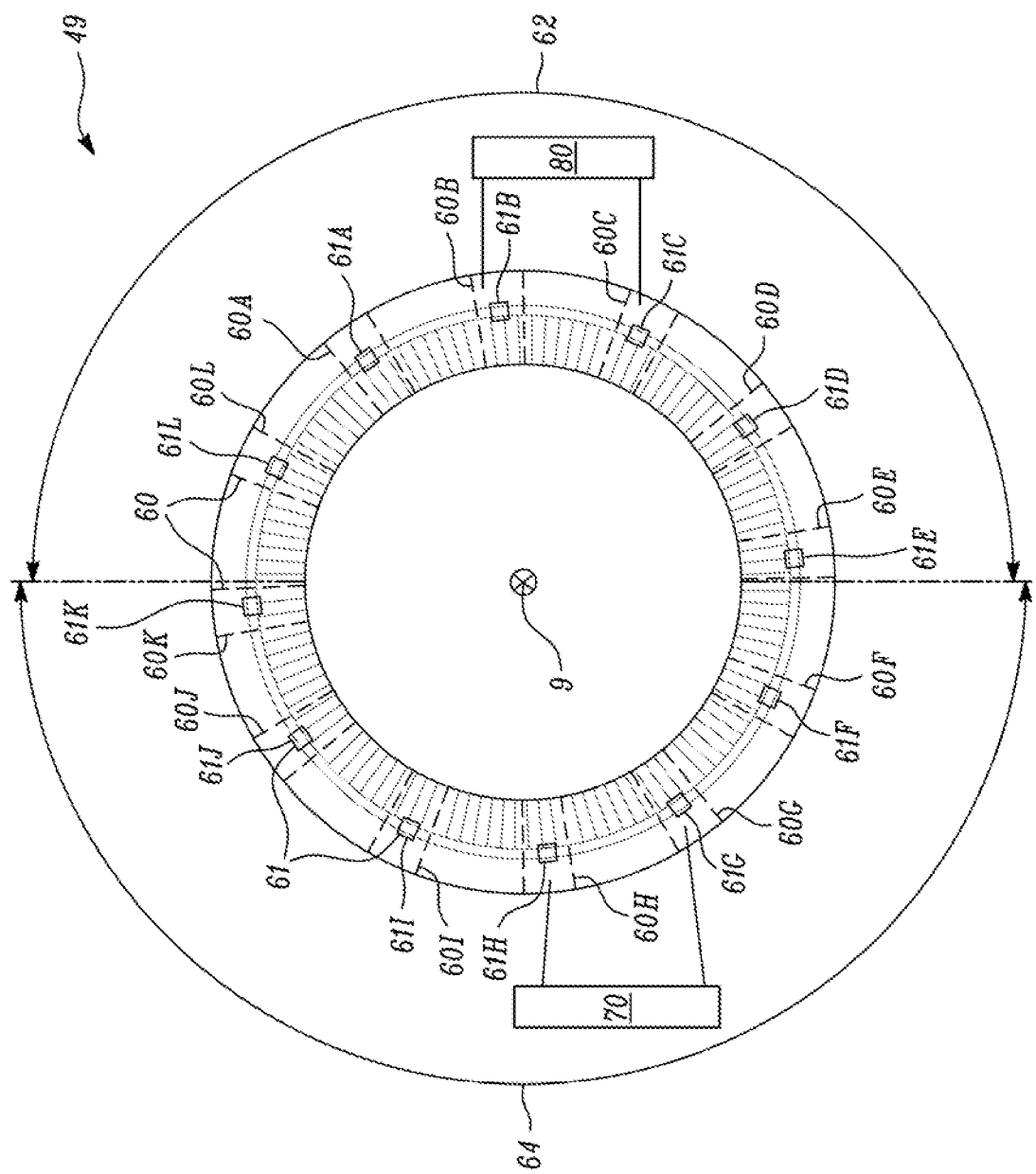
FIG. 4 is a schematic front sectional view of a nozzle guide vane assembly of the gas turbine engine in accordance with an embodiment of the present disclosure.

FIG. 4 illustrates a schematic front sectional view of the LPT nozzle guide vane assembly 49 (also shown in FIG. 2) in accordance with an embodiment of the present disclosure.

The gas turbine engine 10 further includes a plurality of temperature measurement devices 60 circumferentially disposed about the principal rotational axis 9 at a plurality of circumferential positions 61. Each of the plurality of temperature measurement devices 60 is schematically illustrated by two adjacent dashed lines in FIG. 4. Further, each of the plurality of circumferential positions 61 is depicted by a square between the two adjacent dashed lines of the corresponding temperature measurement device 60. Moreover, in FIG. 4, the temperature measurement devices 60A-60L are circumferentially disposed about the principal rotational axis 9 at the respective circumferential positions 61A-61L. The temperature measurement devices 60 may include, for example, thermocouples.

The plurality of temperature measurement devices 60 may be circumferentially disposed on a nozzle guide vane (NGV) assembly of a turbine of the gas turbine engine 10. Specifically, as shown in FIG. 4, the plurality of temperature measurement devices 60 may be circumferentially disposed on the LPT nozzle guide vane assembly 49. Alternatively, in some examples, the plurality of temperature measurement devices 60 may be circumferentially disposed on the HPT nozzle guide vane assembly 47 or the IPT nozzle guide vane assembly 48 (shown in FIG. 2).

The plurality of circumferential positions 61 may be grouped into two channels. Specifically, the plurality of circumferential positions 61 may be grouped into a first channel 62 and a second channel 64. For example, the circumferential positions 61L and 61A-61E may be grouped into the first channel 62, and the circumferential positions 61F-61K may be grouped into the second channel 64. Each of the first channel 62 and the second channel 64 may circumferentially extend by 180 degrees with respect to the principal rotational axis 9.

During operation of the gas turbine engine 10 (shown in FIG. 1), an electronic engine controller (EEC) 80 (shown schematically by a block in FIG. 5) may determine a first average temperature of temperatures determined by the plurality of temperature measurement devices 60 (i.e., 60A-60E, 60L) corresponding to the first channel 62, and a second average temperature of temperatures determined by the plurality of temperature measurement devices 60 (i.e., 60F-60K) corresponding to the second channel 64. The EEC 80 may further determine a temperature difference between the first average temperature and the second average temperature. In some cases, the EEC 80 may reduce engine power parameters if the temperature difference exceeds a cross-check threshold of the EEC 80, thereby reducing thrust produced by the gas turbine engine 10. Therefore, it may be important that the temperature difference remains below the cross-check threshold. In some embodiments, the cross-check threshold may be 15 Kelvin. The EEC 80 may be communicably coupled with the plurality of temperature measurement devices 60 to determine the first average, the second average temperature, and the temperature difference between the first average temperature and the second average temperature. In FIG. 4, the EEC 80 is shown to be communicably coupled to the temperature measurement devices 60B, 60C for clarity purposes only. It may be noted that the EEC 80 may be communicably coupled to each of the plurality of temperature measurement devices 60. The EEC 80 may include one or more processors communicably coupled to a memory for performing various computations and control operations.

In order to individually obtain readings from the plurality of temperature measurement devices 60, a measurement harness 70 may be used. Specifically, the measurement harness 70 may be communicably coupled with the plurality of temperature measurement devices 60 to obtain individual readings from the plurality of temperature measurement devices 60. In FIG. 4, the measurement harness 70 is schematically illustrated by a block and communicably coupled to the temperature measurement devices 60G, 60H for clarity purposes only. It may be noted that the measurement harness 70 may be communicably coupled to each of the plurality of temperature measurement devices 60. The measurement harness 70 may be mounted outside of the gas turbine engine 10 (shown in FIG. 1)

The plurality of circumferential positions 61 may be ranked based on the plurality of temperatures of the combustion gases 43 (shown in FIG. 2) determined using the plurality of temperature measurement devices 60. Specifically, the plurality of circumferential positions 61 may be ranked from a hottest circumferential position 61 to a coldest circumferential position 61. The hottest circumferential position 61 may refer to a circumferential position at which the combustion gases 43 has a highest temperature. The coldest circumferential position 61 may refer to a circumferential position at which the combustion gases 43 has a lowest temperature.

The plurality of circumferential positions 61 corresponds to the plurality of injector positions 51 (shown in FIG. 3). In other words, each injector position 51 may have a corresponding circumferential position 61. The fuel injector 50 disposed at the injector position 51 may have a direct effect on the TGT at the corresponding circumferential position 61.

Figure 5:
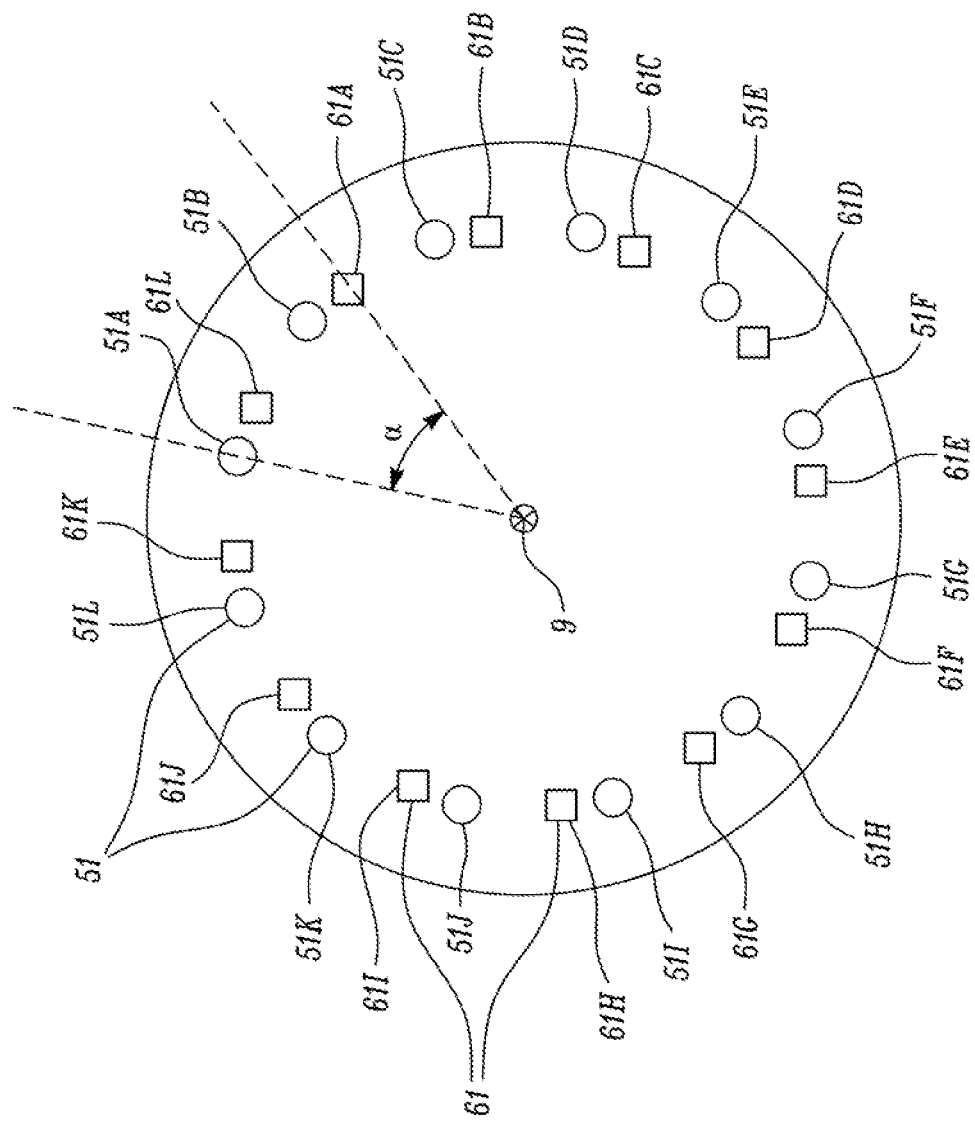
FIG. 5 is a schematic diagram depicting a flow clocking relationship between a plurality of injector positions of the combustion equipment and a plurality of circumferential positions of the nozzle guide vane assembly in accordance with an embodiment of the present disclosure.

FIG. 5 schematically illustrates a flow clocking relationship between the plurality of injector positions 51 and the corresponding plurality of circumferential positions 61.

Each of the plurality of injector positions 51 is depicted by a circle, and each of the plurality of circumferential positions 61 is depicted by a square in FIG. 5. Referring to FIGS. 2 and 5, the combustion gases 43 flowing from the combustion equipment 16 to the low pressure turbine 19 may swirl circumferentially as opposed to flowing straight therethrough, resulting in the flow clocking relationship.

As a result, in some embodiments, each injector position 51 and the corresponding circumferential position 61 may be angularly offset with respect to each other by a predetermined angle α. For example, as shown in FIG. 4, the injector position 51A and the corresponding circumferential position 61A are angularly offset with respect to each other by the predetermined angle α. Similarly, the injector positions 51B-51L and the corresponding circumferential positions 61B-61L may be angularly offset with respect to each other by the predetermined angle α.

The predetermined angle α may depend on various factors, such as a design of the gas turbine engine 10 (shown in FIG. 1). In some embodiments, the predetermined angle α is based on turning of a flow of the combustion gases 43 (shown in FIG. 2) by one or more vane assemblies disposed upstream of the plurality of measurement devices 60. Specifically, the one or more vane assemblies are disposed between the combustion equipment 16 and the plurality of measurement devices 60 with respect to the principal rotational axis 9. For example, as shown in FIG. 2, the one or more vane assemblies disposed upstream of the of plurality of measurement devices 60 may include the HPT nozzle guide vane assembly 47, the IPT nozzle guide vane assembly 48, and the LPT nozzle guide vane assembly 49. Each of the HPT nozzle guide vane assembly 47, the IPT nozzle guide vane assembly 48, and the LPT nozzle guide vane assembly 49 may turn the combustion gases 43 by a respective angle.

The predetermined angle α may therefore depend on turbine design parameters, for example, a number of turbine stages of the gas turbine engine 10 and flow turning provided by each of the one or more vane assemblies disposed upstream of the plurality of measurement devices 60. The predetermined angle α may typically range from 5 degrees to 40 degrees. In some cases, the predetermined angle α may be from 20 degrees to 30 degrees. In some specific cases, the predetermined angle α may be 23 degrees.

FIG. 6 illustrates a method 100 of optimising the performance of combustion equipment of a gas turbine engine having a principal rotational axis in accordance with an embodiment of the present disclosure. For example, the method 100 may be used to optimise the performance of the combustion equipment 16 (shown in FIG. 1) of the gas turbine engine 10.

At step 110, the method 100 includes providing a fuel flow into the combustion equipment via a plurality of fuel injectors circumferentially disposed about the principal rotational axis at a plurality of injector positions in a first circumferential arrangement. The fuel is mixed with air and the mixture is combusted to produce combustion gases. Referring to FIG. 3, for example, the method 100 may include providing a fuel flow into the combustion equipment 16 via the plurality of fuel injectors 50 circumferentially disposed about the principal rotational axis 9 at the plurality of injector positions 51 in the first circumferential arrangement 55.

At step 120, the method 100 further includes determining a plurality of temperatures of the combustion gases at a plurality of circumferential positions downstream of the combustion equipment using a plurality of temperature measurement devices. The plurality of circumferential positions corresponds to the plurality of injector positions. Referring to FIGS. 2 and 4, for example, the method 100 may further include determining the plurality of temperatures of the combustion gases 43 at the plurality of circumferential positions 61 downstream of the combustion equipment 16 using the plurality of temperature measurement devices 60. The plurality of circumferential positions 61 corresponds to the plurality of injector positions 51. In some embodiments, the plurality of circumferential positions 61 downstream of the combustion equipment 16 may correspond to a plurality of circumferential positions at a nozzle guide vane assembly (e.g., the LPT nozzle guide vane assembly 49).

At step 130, the method 100 further includes ranking the plurality of circumferential positions based on the plurality of temperatures of the combustion gases determined using the plurality of temperature measurement devices. The plurality of circumferential positions is ranked from a hottest circumferential position to a coldest circumferential position. Referring to FIGS. 2 and 4, for example, the method 100 may further include ranking the plurality of circumferential positions 61 based on the plurality of temperatures of the combustion gases 43 determined using the plurality of temperature measurement devices 60. The plurality of circumferential positions 61 is ranked from the hottest circumferential position to the coldest circumferential position.

At step 140, the method 100 further includes repositioning at least some of the plurality of fuel injectors between the plurality of injector positions based at least on the ranking of the plurality of circumferential positions. After repositioning of the at least some of the plurality of fuel injectors, the plurality of fuel injectors is disposed at the plurality of injector positions in a second circumferential arrangement different from the first circumferential arrangement. Referring to FIG. 3, for example, the method 100 may further include repositioning at least some of the plurality of fuel injectors 50 between the plurality of injector positions 51 based at least on the ranking of the plurality of circumferential positions 61.

In some embodiments, the method 100 may further include ranking the plurality of fuel injectors from a lowest temperature fuel injector to a highest temperature fuel injector based on predetermined flow test data. Referring to FIG. 3, for example, the method 100 may further include ranking the plurality of fuel injectors 50 from the lowest temperature fuel injector 50 to the highest temperature fuel injector 50 based on the predetermined flow test data. The predetermined flow test data may be available from a manufacturer of the plurality of fuel injectors 50 or suitable tests may be performed on the plurality of fuel injectors 50 to determine the flow test data.

Exemplary rankings of the plurality of plurality of fuel injectors 50 of FIG. 3 and the plurality of circumferential positions 61 of FIG. 4 are provided in Table 1 below for explanatory purposes.

TABLE 1

Exemplary rankings

| Injector Ranking (Low to High) | Fuel Injector | Circumferential Position Ranking (Hottest to Coldest) | Circumferential Position |
|---|---|---|---|
| 1 | 50D | 1 | 61H |
| 2 | 50H | 2 | 61A |
| 3 | 50B | 3 | 61B |
| 4 | 50A | 4 | 61E |
| 5 | 50G | 5 | 61C |
| 6 | 50J | 6 | 61D |
| 7 | 50L | 7 | 61K |
| 8 | 50F | 8 | 61G |
| 9 | 50C | 9 | 61I |
| 10 | 50E | 10 | 61F |
| 11 | 50I | 11 | 61L |
| 12 | 50K | 12 | 61J |

For the purposes of explanation, it is assumed that each injector position 51A-51L corresponds to the respective circumferential position 61A-61L. As discussed above, each injector position 51A-51L and the corresponding circumferential position 61A-61L may be angularly offset with respect to each other by the predetermined angle α. Based on the rankings provided above in Table 1, one example of how the plurality of fuel injectors 50 may be repositioned is provided below in Table 2.

TABLE 2

Repositioning of fuel injectors

| Injector Position | Fuel Injector |
|---|---|
| 51A | 50H |
| 51B | 50B |
| 51C | 50G |
| 51D | 50J |
| 51E | 50A |
| 51F | 50E |
| 51G | 50F |
| 51H | 50D |
| 51I | 50C |
| 51J | 50K |
| 51K | 50L |
| 51L | 50I |

Figure 7:
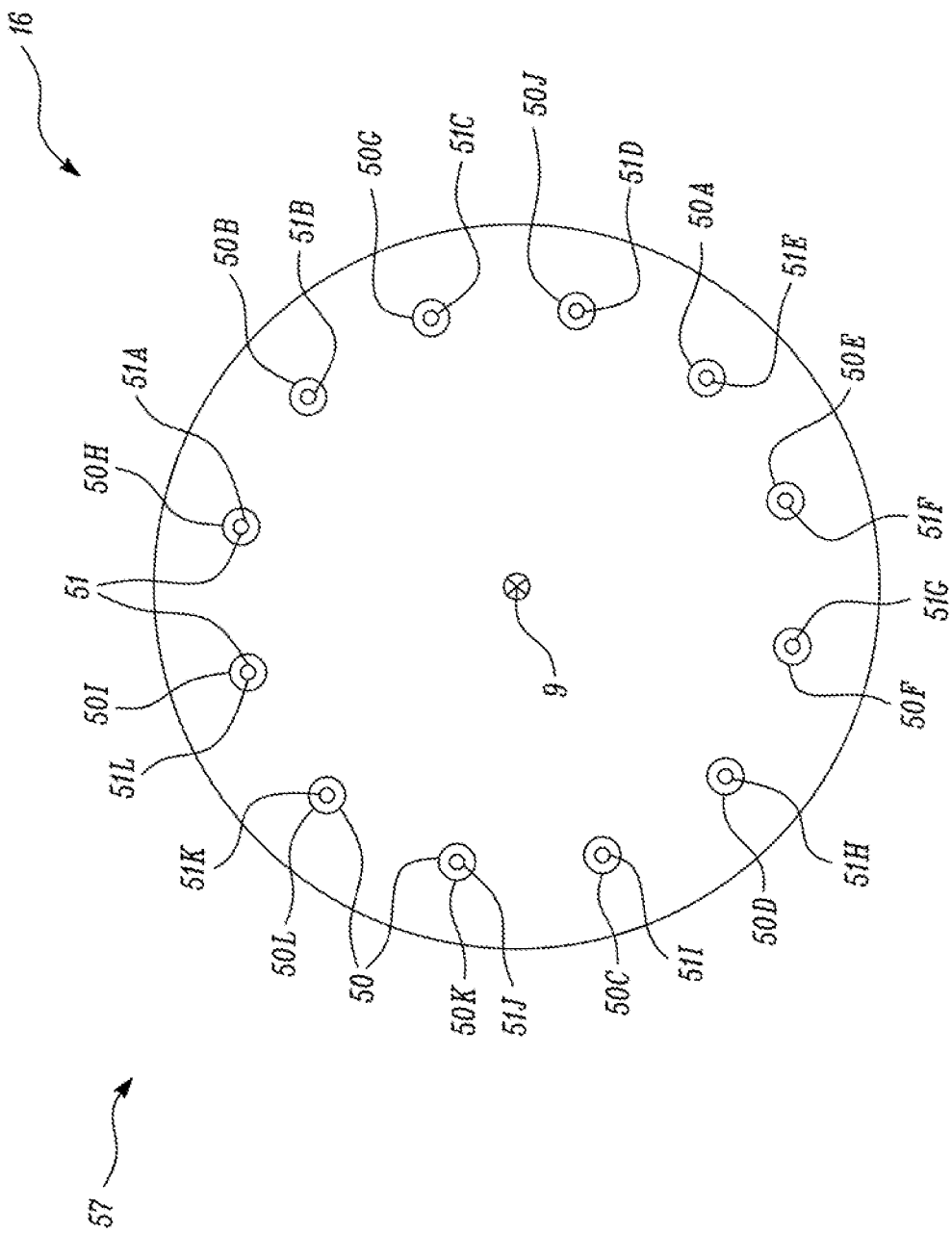
FIG. 7 is a schematic front sectional view of the combustion equipment of the gas turbine engine after repositioning at least some of the plurality of fuel injectors based on the method of FIG. 6 in accordance with an embodiment of the present disclosure.

FIG. 7 illustrates a schematic front sectional view of the combustion equipment 16 with the plurality of fuel injectors 50 after repositioning thereof based on the method 100 of FIG. 6 in accordance with an embodiment of the present disclosure.

Referring to Table 2 and FIG. 7, after repositioning of the at least some of the plurality of fuel injectors 50, the plurality of fuel injectors 50 is disposed at the plurality of injector positions 51 in a second circumferential arrangement 57 different from the first circumferential arrangement 55 (shown in FIG. 3).

In some embodiments, repositioning the at least some of the plurality of fuel injectors 50 may be further based on the ranking of the plurality of fuel injectors 50. For example, the repositioning of the plurality of fuel injectors 50 as per the arrangement shown in Table 2 is based on the ranking of the plurality of fuel injectors 50.

In some embodiments, repositioning the at least some of the plurality of fuel injectors further includes disposing the lowest temperature fuel injector at the injector position corresponding to the hottest circumferential position, and disposing the highest temperature fuel injector at the injector position corresponding to the coldest circumferential position.

Referring to Tables 1, 2 and FIG. 7, for example, repositioning the at least some of the plurality of fuel injectors 50 may further include disposing the lowest temperature fuel injector 50 (50D according to Table 1) at the injector position 51 (51H according to Table 2) corresponding to the hottest circumferential position 61 (61H according to Table 1). Moreover, repositioning the at least some of the plurality of fuel injectors 50 may further include disposing the highest temperature fuel injector 50 (50K according to Table 1) at the injector position 51 (51J according to Table 2) corresponding to the coldest circumferential position (61J according to Table 1).

In some embodiments, repositioning the at least some of the plurality of fuel injectors further includes disposing intermediate fuel injectors ranked between the lowest temperature fuel injector and the highest temperature fuel injector at respective injector positions corresponding to the circumferential positions ranked between the hottest circumferential position and the coldest circumferential position.

Referring to Tables 1, 2 and FIG. 7, for example, repositioning the at least some of the plurality of fuel injectors 50 may further include disposing intermediate fuel injectors 50 ranked between the lowest temperature fuel injector 50 (50D according to Table 1) and the highest temperature fuel injector 50 (50K according to Table 1) at respective injector positions 51 corresponding to the circumferential positions 61 ranked between the hottest circumferential position 61 (61H according to Table 1) and the coldest circumferential position 61 (61J according to Table 1).

In the illustrated example of FIG. 7, the intermediate fuel injector 50B is already at the injector position 51B, and hence does not require repositioning. However, the intermediate fuel injector 50G has to be repositioned from the injector position 51G to the injector position 51C. Therefore, in some cases, only a subset of the plurality of fuel injectors 50 may need to be repositioned as per the method 100, and one or more fuel injectors 50 may already be disposed at desired injector positions 51.

In some embodiments, the method 100 further includes grouping the plurality of circumferential positions into a first channel and a second channel. Each of the first channel and the second channel circumferentially extends by 180 degrees with respect to the principal rotational axis. The method 100 further includes determining a first average temperature of the temperatures determined by the temperature measurement devices corresponding to the first channel. The method 100 further includes determining a second average temperature of the temperatures determined by the temperature measurement devices corresponding to the second channel. The method 100 further includes determining a temperature difference between the first average temperature and the second average temperature. Repositioning the at least some of the plurality of fuel injectors is further based on the temperature difference.

Referring to FIG. 4, for example, the method 100 may include grouping the plurality of circumferential positions 61 into the first channel 62 and the second channel 64. As discussed above, each of the first channel 62 and the second channel 64 may circumferentially extend by 180 degrees with respect to the principal rotational axis 9. The method 100 may further include determining a first average temperature of the temperatures determined by the temperature measurement devices 60 corresponding to the first channel 64 (for example, the circumferential positions 61L and 61A-61E in FIG. 4). The method 100 may further include determining a second average temperature of the temperatures determined by the temperature measurement devices 60 corresponding to the second channel 64 (for example, the circumferential positions 61F-61K in FIG. 4). The method 100 may further include determining a temperature difference between the first average temperature and the second average temperature. Further, repositioning the at least some of the plurality of fuel injectors 50 (shown in FIG. 3) is further based on the temperature difference.

FIG. 8 illustrates a graph 200 depicting a temperature difference 210T between the first average temperature measured at the first channel 62 and the second average temperature measured at the second channel 64 before repositioning of the plurality of fuel injectors 50 (shown in FIG. 3).

FIG. 9 illustrates a graph 250 depicting a temperature difference 260T between the first average temperature and the second average temperature after repositioning of the plurality of fuel injectors 50 (shown in FIG. 7) based on the method 100 of FIG. 6.

Referring to FIGS. 3, 6, 7, and 8, the temperature difference 210T before repositioning of the plurality of fuel injectors 50 may be greater than the cross-check threshold. This may cause TGT cross-check issues. After repositioning of the plurality of fuel injectors 50 based on the method 100, as shown in FIG. 9, the temperature difference 260T may be less than the cross-check threshold. In some embodiments, after repositioning of the at least some of the plurality of fuel injectors 50, the temperature difference 260T between the first average temperature and the second average temperature is less than or equal to 15 Kelvin. Therefore, repositioning the plurality of fuel injectors 50 based on the method 100 may reduce or prevent TGT cross-check issues.

Referring back to FIG. 6, in some embodiments, the method 100 further includes communicably coupling the plurality of temperature measurement devices with a measurement harness. Referring to FIG. 4, for example, the method 100 may further include communicably coupling the plurality of temperature measurement devices 60 with the measurement harness 70.

The method 100 may be performed during a maintenance of the gas turbine engine. In some embodiments, the fuel flow may be provided to the combustion equipment during a maintenance of the gas turbine engine. Referring to FIG. 2, for example, the fuel flow may be provided to the combustion equipment 16 during a maintenance of the gas turbine engine 10.

In some embodiments, repositioning the at least some of the fuel injectors may further include detaching the at least some of the fuel injectors from the combustion equipment and attaching the at least some of the fuel injectors to the combustion equipment at corresponding injector positions of the second circumferential arrangement.

Referring to FIGS. 2, 3, and 7, for example, repositioning the at least some of the fuel injectors 50 may further include detaching the at least some of the fuel injectors 50 from the combustion equipment 16 and attaching the at least some of the fuel injectors 50 to the combustion equipment 16 at corresponding injector positions 51 of the second circumferential arrangement 57. In some embodiments, repositioning of the at least some of the fuel injectors 50 may be manually carried out by a maintenance engineer.

In some cases, each of the at least some of the fuel injectors 50 may be conveniently detached from the combustion equipment 16 by removing/loosening one or more respective fasteners. Further, each of the at least some of the fuel injectors 50 may be conveniently attached to the corresponding injector positions 51 of the second circumferential arrangement 57 via the one or more respective fasteners.

Therefore, the method 100 may improve the performance of the combustion equipment 16, reduce or prevent TGT cross-check issues, and prevent requirement of an expensive engine overhaul during the maintenance of the gas turbine engine 10 (shown in FIG. 1). Further, the method 100 may be conveniently performed by the maintenance engineer during the maintenance of the gas turbine engine 10.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of optimising performance of combustion equipment of a gas turbine engine having a principal rotational axis, the method comprising the steps of:
   providing a fuel flow into the combustion equipment via a plurality of fuel injectors circumferentially disposed about the principal rotational axis at a plurality of injector positions in a first circumferential arrangement, wherein the fuel is mixed with an air and a mixture of the fuel and the air is combusted to produce combustion gases;
   determining a plurality of temperatures of the combustion gases at a plurality of circumferential positions downstream of the combustion equipment using a plurality of temperature measurement devices, wherein the plurality of circumferential positions corresponds to the plurality of injector positions;
   ranking the plurality of circumferential positions based on the plurality of temperatures of the combustion gases determined using the plurality of temperature measurement devices, wherein the plurality of circumferential positions is ranked from a hottest circumferential position to a coldest circumferential position; and
   repositioning at least some fuel injectors of the plurality of fuel injectors between the plurality of injector positions based at least on the ranking of the plurality of circumferential positions, wherein, after repositioning of the at least some fuel injectors of the plurality of fuel injectors, the plurality of fuel injectors is disposed at the plurality of injector positions in a second circumferential arrangement different from the first circumferential arrangement.

2. The method of claim 1, further comprising ranking the plurality of fuel injectors from a lowest temperature fuel injector to a highest temperature fuel injector based on predetermined flow test data, wherein repositioning the at least some fuel injectors of the plurality of fuel injectors is further based on the ranking of the plurality of fuel injectors.

3. The method of claim 2, wherein repositioning the at least some fuel injectors of the plurality of fuel injectors further comprises:
   disposing the lowest temperature fuel injector of the plurality of fuel injectors at the injector position of the plurality of injector positions corresponding to the hottest circumferential position of the plurality of circumferential positions; and
   disposing the highest temperature fuel injector of the plurality of fuel injectors at the injector position of the plurality of injector positions corresponding to the coldest circumferential position of the plurality of circumferential positions.

4. The method of claim 3, wherein repositioning the at least some fuel injectors of the plurality of fuel injectors further comprises disposing intermediate fuel injectors of the plurality of fuel injectors ranked between the lowest temperature fuel injector and the highest temperature fuel injector at respective injector positions of the plurality of injector positions corresponding to the circumferential positions of the plurality of circumferential positions ranked between the hottest circumferential position and the coldest circumferential position.

5. The method of claim 1, further comprising the steps of:
   grouping the plurality of circumferential positions into a first channel and a second channel, wherein each of the first channel and the second channel circumferentially extends by 180 degrees with respect to the principal rotational axis;
   determining a first average temperature of the temperatures of the plurality of temperatures determined by the temperature measurement devices of the plurality of temperature measurement devices corresponding to the first channel;
   determining a second average temperature of the temperatures of the plurality of temperatures determined by the temperature measurement devices of the plurality of temperature measurement devices corresponding to the second channel; and
   determining a temperature difference between the first average temperature and the second average temperature;
   wherein repositioning the at least some fuel injectors of the plurality of fuel injectors is further based on the temperature difference.

6. The method of claim 5, wherein, after repositioning of the at least some fuel injectors of the plurality of fuel injectors, the temperature difference between the first average temperature and the second average temperature is less than or equal to 15 Kelvin.

7. The method of claim 1, wherein each of the plurality of injector positions corresponds to a respective circumferential position of the plurality of circumferential positions with an angular offset having a predetermined angle.

8. The method of claim 1, wherein the plurality of temperature measurement devices is circumferentially disposed on a nozzle guide vane assembly of a turbine of the gas turbine engine.

9. The method of claim 1, further comprising communicably coupling the plurality of temperature measurement devices with a measurement harness.

10. The method of claim 1, wherein repositioning the at least some fuel injectors of the plurality of fuel injectors further comprises detaching the at least some fuel injectors of the plurality of fuel injectors in the first circumferential arrangement from the combustion equipment and attaching the at least some fuel injectors of the plurality of fuel injectors to the combustion equipment at corresponding injector positions of the second circumferential arrangement.

11. The method of claim 1, wherein the fuel flow is provided to the combustion equipment during a maintenance of the gas turbine engine.

* * * * *